United States Patent [19]

Woods

[11] 4,341,413
[45] Jul. 27, 1982

[54] VEHICLE BODY

[75] Inventor: Kenneth P. R. Woods, Southwick, England

[73] Assignee: Coachwork Conversions Limited, Colne, England

[21] Appl. No.: 37,445

[22] Filed: May 9, 1979

[30] Foreign Application Priority Data

May 30, 1978 [GB] United Kingdom ............... 24625/78

[51] Int. Cl.³ ............................................. B62D 25/00
[52] U.S. Cl. ........................................ 296/50; 49/252; 105/378
[58] Field of Search ...................... 296/146, 50, 51, 56, 296/57 R, 22; 49/123, 246, 248, 252, 250, 260; 105/283, 284, 289, 292, 378

[56] References Cited

U.S. PATENT DOCUMENTS

| 1,918,475 | 7/1933 | Lassinsky | 49/250 |
| 2,330,670 | 9/1943 | Black | 105/378 |
| 2,711,343 | 6/1955 | Falk et al. | 296/56 |
| 3,516,366 | 6/1970 | Bradford et al. | 105/378 |
| 3,821,923 | 7/1974 | Dauge | 49/252 |

FOREIGN PATENT DOCUMENTS

| 233629 | 5/1964 | Austria | 105/378 |
| 823331 | 12/1951 | Fed. Rep. of Germany | 49/250 |
| 1082524 | 11/1960 | Fed. Rep. of Germany | 49/248 |
| 2813593 | 10/1979 | Fed. Rep. of Germany | 296/50 |

Primary Examiner—Joseph F. Peters, Jr.
Assistant Examiner—Ross Weaver
Attorney, Agent, or Firm—Ross, Ross & Flavin

[57] ABSTRACT

A vehicle body comprises a pair of swingable doors giving access to a load carrying interior of the body. To facilitate opening and closing of the doors a coupling mechanism links the doors for simultaneous counterbalanced movement.

2 Claims, 4 Drawing Figures

VEHICLE BODY

BACKGROUND TO THE INVENTION

The invention relates to vehicle bodies.

Commercial vehicles are known which have a load carrying region which is substantially or completely enclosed and to which access is provided by one or more doors which may be of a variety of different types e.g. vertically hinged doors, horizontally hinged doors, roller shutter doors etc. It is known to provide doors in the long side walls of a commercial vehicle in which case it is most convenient if the doors are arranged to pivot or rotate about respective horizontal axes into regions above and below the load carrying region so that the load carrying region is made fully accessible without the opened doors providing any hinderance.

Commercial vehicles are also known in which pairs of horizontally pivotable doors which open, to give access into the load carrying region of a vehicle body are linked such that pivotal movement of a lower of the doors into an opened position results in a corresponding opening pivotal movement of the upper of the doors and the simultaneous tensioning of a spring, which spring subsequently serves to effect the closing movement of the upper door. A disadvantage of this arrangement is the added complication of a spring mechanism, and the lack of a positive connection between the doors in both opening and closing directions. Further, a spring mechanism may give long term reliability problems.

BRIEF SUMMARY OF THE INVENTION

It is an aim of the present invention to provide a vehicle body having one or more pairs of doors giving access to a load carrying space and in which actuation of either of the doors of the or each pair of doors either from a closed to an open position or vice versa effects a corresponding movement of the other or the or the respective pair of doors.

According to the present invention there is provided a vehicle body having a wall, at least one pair of doors in the wall, a coupling mechanism linking the doors such that movement of either of the doors whether in an opening direction or in a closing direction of that door necessarily effects a corresponding opening or closing movement respectively of the other of the doors.

Preferably the coupling mechanism comprises a respective sprocket wheel for each door, the sprocket wheels being linked, for example by a rod or cable and chain assembly in a figure eight loop.

DESCRIPTION OF THE PREFERRED EMBODIMENTS

Figure 1:
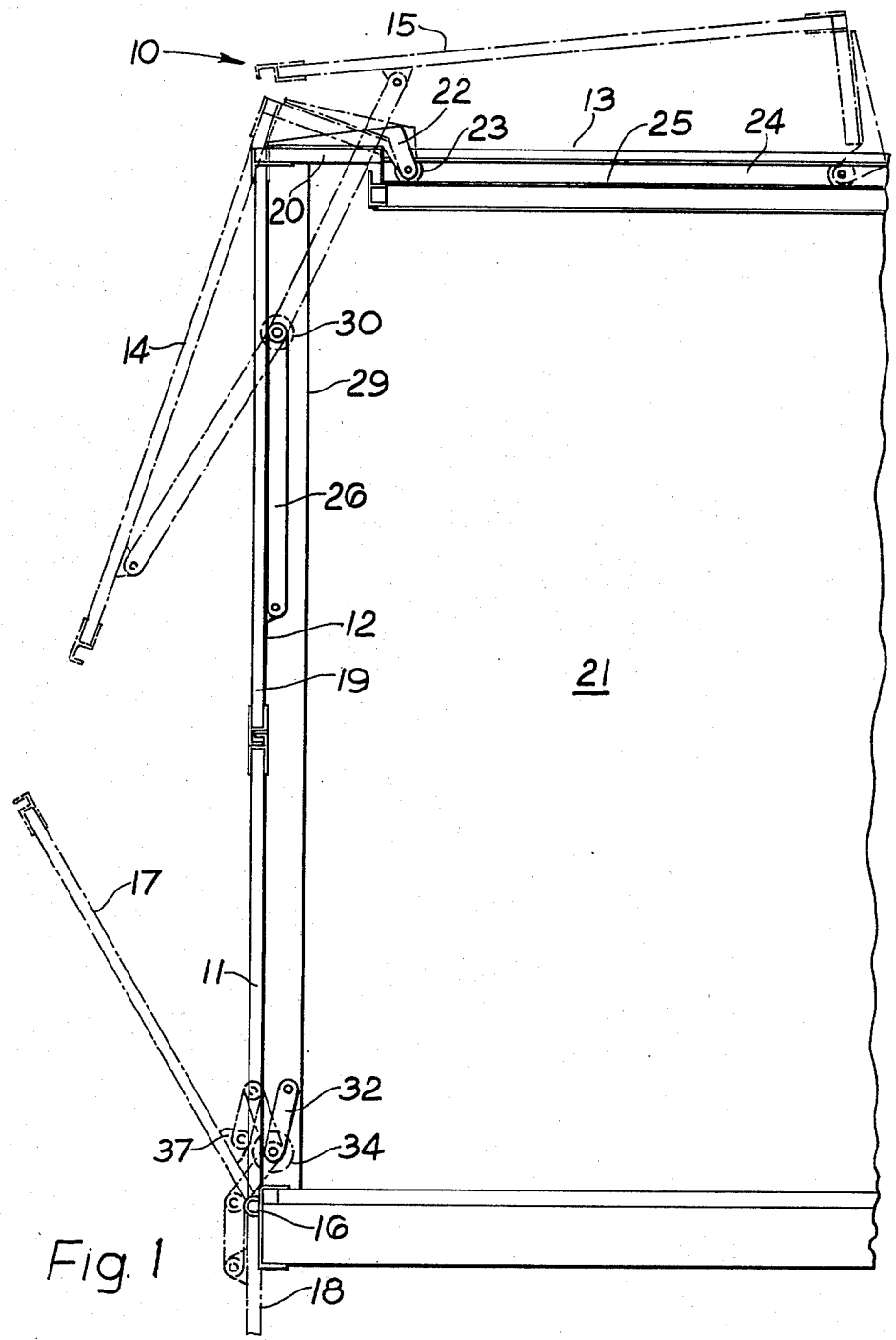
FIG. 1 is a schematic side view of part of a first embodiment of a vehicle body constructed in accordance with the present invention.

FIG. 1 shows a portion of a vehicle body, designated as a whole by the numeral 10, having a lower horizontally pivotally mounted door 11, and an upper door 12 operative to swing about a horizontal axis into a position over a roof 13 of the vehicle body. An intermediate position 14 and a final position 15 (over the roof 13) of the upper door 12 are shown in broken line form to indicate the opening sequence. The lower door 11 is pivotable about a horizontal axis 16 and again the opening sequence is indicated by showing in broken line form an intermediate position 17 and a final (fully open) position 18 of the door 11.

Figure 2:
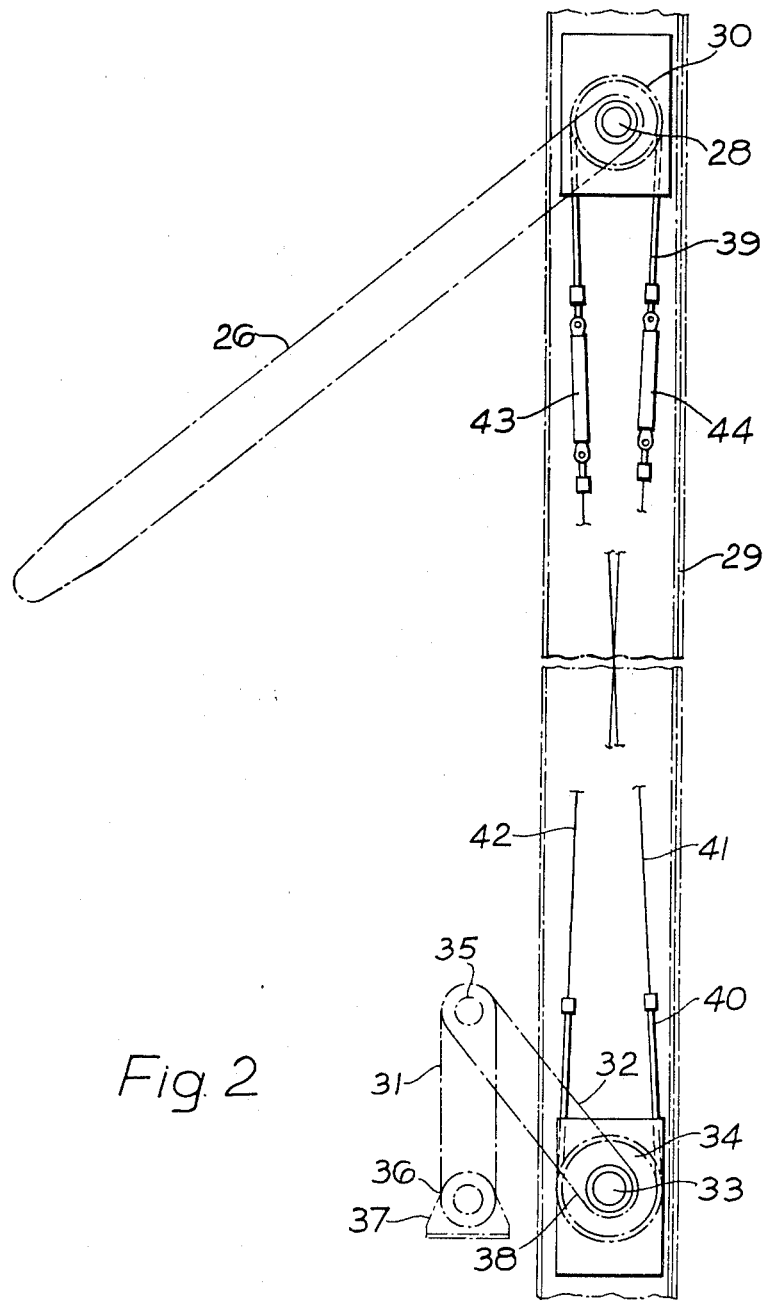
FIG. 2 is a schematic side view of a coupling mechanism.

The upper door 11 is of L-shaped cross-section, a longer portion 19 serving to close off the upper side of the vehicle body 10 whilst a shorter position 20 of the door 11 extends at right angles to the portion 19, and over a load carrying space 21 of the vehicle body. The short portion 20 of the door 11 has, attached thereto, two respective spaced brackets 22 only one of which is shown in the drawings. Each bracket 22 carries a wheel 23 rotatably mounted at the free end of the bracket and arranged for movement within a respective slot 24 in the roof 13 and along a track 25. An actuating arm 26 is pivotally attached at one end to the longer portion of the door 11, whilst the other end of the arm 26 is fixedly attached to a short shaft 28 (FIG. 2) mounted within a vertical pillar 29 for rotation about a horizontal axis.

A sixteen-toothed sprocket wheel 30 is fixedly mounted on the shaft 28 for rotation together with the shaft.

The lower door 11 is attached by way of two linked arms 31 and 32 to a shaft 33 disposed within the pillar 29 for pivotal movement about a horizontal axis. A nineteen toothed sprocket 34 is fixedly attached to the shaft 33 for rotation therewith. The arms 31 and 32 are pivotally linked together at a joint 35 and one end 36 of the shorter arm 31 is pivotally attached to a bracket 37 fixed to the lower door 11 whilst an end 38 of the longer arm 32 is fixedly attached to the shaft 33.

The sprocket wheels 30 and 34 are linked together by a rod or cable and chain mechanism in such a way that movement of sprocket 34 in one sense of rotation necessarily produces a movement of sprocket 30 in the opposite sense of rotation, this being the case whether the sprocket 34 is rotated anticlockwise (opening movement) or clockwise (closing movement). The rod on cable and chain mechanism consists of short lengths 39 and 40 of duplex chain disposed respectively around the sprocket wheels 30 and 34. The ends of the chain lengths are each connected in crosswise fashion to a corresponding respective end of the chain on the opposite sprocket by means of connecting members 41 and 42 which may be rods or cables. Turnbuckles 43 and 44 are interposed between the connecting members 41, 42 and the ends of chain 39 and serve for adjustment of tension in the mechanism. In practice it has been found preferable and advantageous to employ rods instead of cables as connecting members since this results in a reduced tendency for the coupling mechanism to require adjustment and gives a more positive action which cables, because of their elasticity and tendency to stretch, cannot provide. It will be understood that in the foregoing description the coupling mechanism is duplicated at opposite ends of the doors.

The maximum length (as seen in FIG. 1) of the lower door 11 is determined by the height of pivot point 16 above ground level if the door is to be capable of moving into the lowermost position 18. For this reason the door 11 is of smaller dimension than the upper door 12.

Although the lower door 11 is of smaller dimensions and lower weight than the upper door 12, the two doors are counter balanced during opening and closing movements, even though the gear ratio of the sprockets 34 and 30 is 19:16, because of the difference in the movements of the two doors. The greater number of teeth on the sprocket 34 compared to sprocket 30 allows a full opening movement of the upper door 12.

To open the doors 11 and 12 from the illustrated closed position, the lower door is rotated about the horizontal axis 16 and this rotational movement is communicated by way of the linked arms 31 and 32, and a shaft 33, to the sprocket wheel 34. Angular displacement of the sprocket wheel 34 produces, by way of the rod or cable and chain arrangement, a contra-rotation of the sprocket wheel 30 through a greater angle. Thus the actuating arm 26 is rotated outwardly so that an opening movement of door 12 is produced simultaneously with the opening of door 11. An initially more rapid movement of the lowermost portion of door 12 allows for smooth disengagement of the two doors. The opening of door 11 is effected with a minimum of effort because of the counter-balancing nature of the mechanism connecting the two doors. As the door 11 moves further towards the fully open position so the actuating arm 26 rotates through an increasing angle and the door 12 is simultaneously lifted and slidingly displaced into its uppermost position 15 shown in FIG. 1. As can be seen from FIG. 1 the total rotation of arm 26 (and thus also sprocket 30) is greater than 180°, whereas the total rotation of arm 32 is less than 180°, the actual ratio of these rotations being, of course, 19:16 in the present case. As will be apparent from the drawings, the total upward movement of the centre of gravity of the upper door 12 is less than the corresponding vertical displacement of the centre of gravity of the lower door 11, thus although the doors have different masses they may, as in the present case, be counter balanced without the addition of any extra counter-balancing weights. The doors may be similarly and simultaneously closed, by the single rotation of the lower door 11 in a clockwise sense, the movement being communicated to the upper door 12 by way of the cable and chain linkage. The closing movement is also achieved with minimum effort (because of the counterbalancing) and by the actuation of the same door i.e. the lower door 11. Not only, therefore, is the load space 21 made fully accessible, by virtue of the fact that the doors are moved fully out of the way in their open positions, but the actual opening and closing of the doors may be effected by actuation of the lowermost (and therefore most accessible) door 11.

Figure 3:
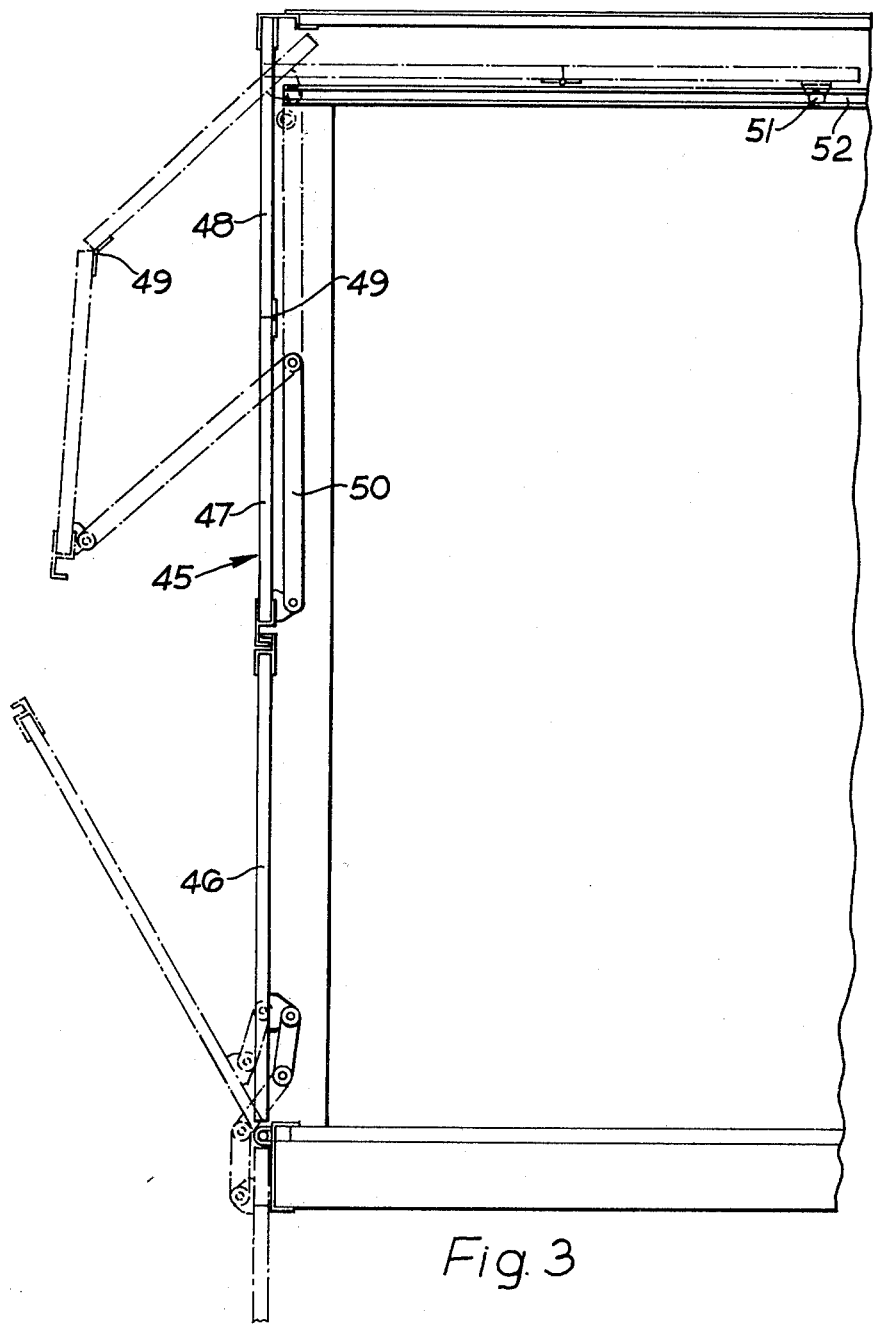
FIG. 3 is a schematic side view of part of a second embodiment of a vehicle body constructed in accordance with the present invention.

In FIG. 3 is shown an arrangement similar to that of FIG. 1 but in which an upper door 45 is adapted, in its open position, to slide into place beneath the roof of the vehicle body. A lower door 46 is exactly similar to the lower door 11 of the FIG. 1 embodiment, and the coupling mechanism between the doors 45 and 46 is similar to that shown in FIG. 2. The upper door 45 comprises two separate sections 47 and 48 which are connected together by way of a hinge 49. The lower section 47 of door 45 is pivotally connected at one end to an actuation arm 50 which in turn is fixedly connected at its end remote from the section 47 to the shaft of a sprocket-wheel, exactly as in the embodiment of FIG. 1. The section 48 has a bracket 51 to which is attached a wheel which moves in a guideway 52. It will of course be understood that, as in the previously described embodiment, the actuating and coupling mechanisms of the doors 45 and 46 are duplicated at their opposite ends not shown in the drawing and similarly a guideway corresponding to, in parallel with and spaced from guideway 52 is provided for the opposite end (not shown) of section 48. As before, intermediate and final positions of the two doors are indicated in broken line form to show the opening sequence of the doors. To open the doors the lower door 46 is pivoted in an anticlockwise sense and this movement is communicated via a coupling mechanism to the sprocket wheel mounted on the shaft to which the actuating arm 50 is fixed. The actuating arm is thus simultaneously rotated in a clockwise sense, so that the door 45 is carried upwardly. Since the wheel attached to bracket 51 is constrained to move within the guideway 52 the door 45 slides into position beneath the roof with an initial folding movement at the hinge, 49. In this case also the sprocket wheel to which the lower door 46 is coupled has a greater number of teeth than does the sprocket wheel to which the upper door 45 is coupled, though the gear ratio is lower because the actuating arm only performs a 180° movement. The closing movement of the doors 45 and 46 is achieved, as before, by the actuation of only the lower door 46 which is moved in a clockwise rotation, and since the doors are counterbalanced through the coupling mechanism only a minimum effort is required. Although in this case the upper door occupies, when in its raised position, some of the storage space or headroom in the vehicle interior it has the advantage that no clearance is required above the vehicle roof before the doors can be opened.

Figure 4:
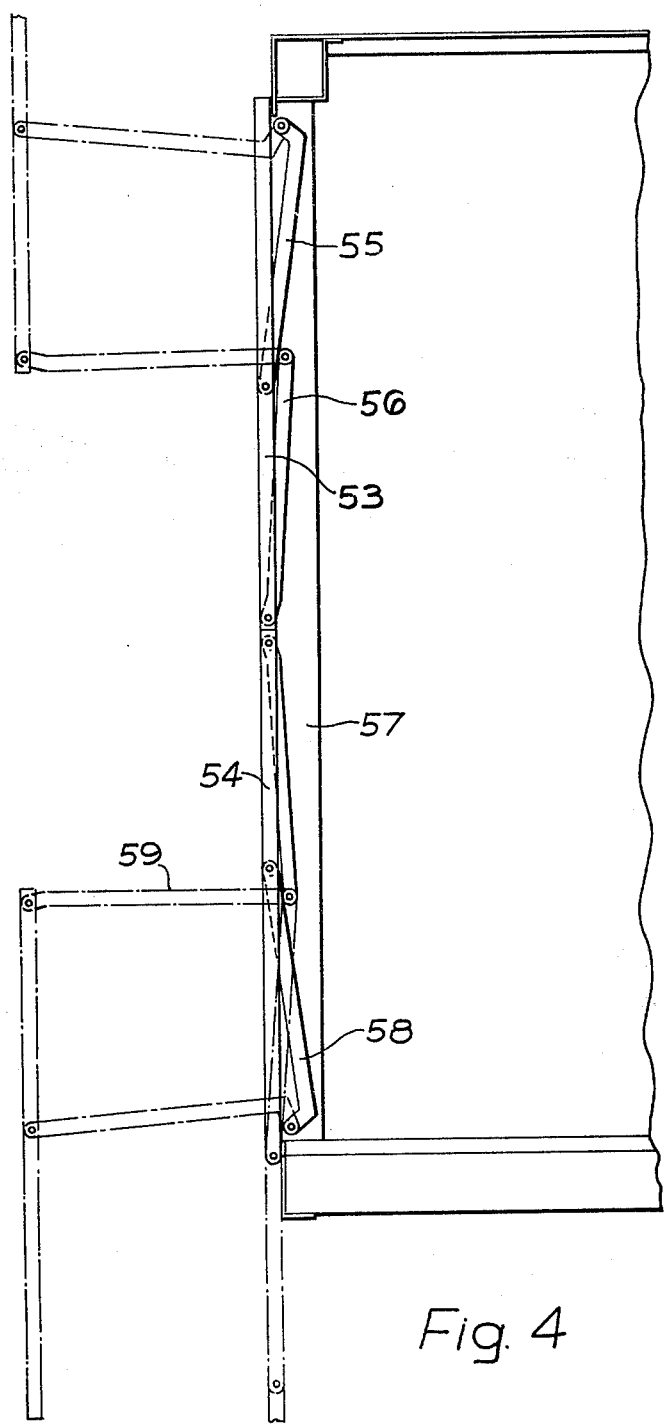
FIG. 4 is a schematic side view of part of a third embodiment of a vehicle body constructed in accordance with the present invention.

FIG. 4 illustrates another door opening variation in which the doors 53 and 54 are mounted in pantograph fashion. The upper door 53 is provided with an actuating arm 55 pivotally attached at one end to a central position on one side of the door, the other end being fixed to a shaft on which a sprocket wheel of the coupling mechanism is mounted. A further, passive, stabilising arm 56 is pivotally attached, at one end, within a pillar 57 housing the coupling mechanism between the doors whilst the other end of the passive arm 56 is pivotally attached to the lower end of the door 53. The lower door 54 is similarly provided with an actuating arm 58 and a passive stabilising arm 59. As before, the door mechanism is shown only at one end (in a horizontal sense) and a corresponding duplicate arrangement is provided at the opposite end. In this case the rotational movements of the actuating arms 55 and 58 are equal and the sprocket wheels to which they are linked have the same number of teeth. The sprocket wheels are coupled for contra-rotation by a chain and rod or cable mechanism and because the doors are of equal dimensions they counterbalance one another through the coupling mechanism. If, to provide clearance above the ground when the doors are open, the lower is made shorter than the upper door then counterbalancing may be achieved by use of suitable weights attached to the lower door 54 or fitted within the coupling mechanism between the doors. The opening sequence is indicated in the drawing and again both the opening and the closing movements of the doors may be effected by the appropriate movement of the lower door along or, if more convenient, by the upper door alone. This arrangement has the advantage of simplicity but the minor disadvantage that the upper door 53 extends vertically above the roof when in the open position then making it unsuitable for occasional loading or unloading situations in which the space above the roof of the vehicle is insufficient to allow complete opening of the doors.

Various other arrangements of linked and counterbalanced doors are possible within the scope of the present invention. A pantograph type of lower door may be used in conjunction with an upper door of the type illustrated in FIG. 1 or FIG. 3. The folding upper door of FIG. 3 would be hinged in a plurality of positions and indeed could be a roller shutter door with mechanism coupled to the lower door. The upper door could be rigid and coupled to the lower door so as to pivot inwardly and into position under the roof during the door opening sequence. The upper door could be of the pantograph type with the upper door in the form of any of the other hitherto mentioned types. Of course, pairs of doors in accordance with the invention may be provided on more than one side of the vehicle body and whose such doors are disposed on opposite sides of the body the upper doors may advantageously be adapted to move into overlapping positions when open, this being particularly desirable when the vehicle body is narrow and/or when the upper door (which may be of the type which locates under or over the vehicle roof) is larger than the lower door to allow for full opening of the doors.

The pillars housing the coupling mechanisms between the doors are each largely completely enclosed to afford protections against the ingress of dirt and moisture. A respective removable panel allows access to the interior of each pillar.

We claim:

1. A vehicle body structure including a wall having an opening therein and door means for closing the opening and being movable to an open disposition relative thereto, the door means comprising: a lower door occupying a lower portion of the opening, substantially horizontal hinge means extending along the lower edge of the lower door and mounting the lower door relative to the wall and including a substantially horizontal lower shaft rotatable with the lower door, a lower wheel mounted on the lower shaft, an upper door occupying an upper portion of the opening and serving together with the lower door for the closure of the entirety of the opening, an arm mounting the upper door to the body structure, an upper shaft carrying the arm and adapted upon rotation for swinging the arm outwardly and upwardly relative to the body structure for opening the upper door in an upward movement and carrying the door to an inoperative position within the body structure, an upper wheel mounted on the upper shaft, flexible coupling means extending in a figure 8 configuration around the upper and lower wheels in a wheel coupling relationship whereby movement of either one of the doors in opening direction imposes a corresponding simultaneous opening movement on the other of the doors and movement of either one of the doors in closing direction imposes a corresponding simultaneous closing movement of the other of the doors, the upper door including a plurality of hinged portions with an end one of the hinged portions being provided with a guide member constrained to run along a respective guide track during the opening and closing movement.

2. A vehicle body as claimed in claim 1 in which the guide member comprises a roller attached to a respective bracket on the end one of the hinged portions.

* * * * *